United States Patent [19]
Kim et al.

[11] Patent Number: 5,678,092
[45] Date of Patent: Oct. 14, 1997

[54] CAMERA DISPLAY RESPONSIVE TO MOVEMENT OF LENS CAP

[75] Inventors: Seong-tae Kim, Kyungki-do; Bon-jeong Goo, Kyeongsangnam-do, both of Rep. of Korea

[73] Assignee: Samsung Aerospace Industries, Ltd., Kyeongsangnam-do, Rep. of Korea

[21] Appl. No.: 733,175

[22] Filed: Oct. 17, 1996

Related U.S. Application Data

[63] Continuation of Ser. No. 160,270, Sep. 2, 1993, abandoned.

[30] Foreign Application Priority Data

Dec. 4, 1992 [KR] Rep. of Korea ............... 92-23332
Dec. 10, 1992 [KR] Rep. of Korea ............... 92-23886

[51] Int. Cl.⁶ .................................................. G03B 17/00
[52] U.S. Cl. ........................................... 396/287; 396/448
[58] Field of Search ............................ 396/281, 287–292, 396/348–350, 448

[56] References Cited

U.S. PATENT DOCUMENTS

| | | | |
|---|---|---|---|
| 4,460,264 | 7/1984 | Winter | 354/484 X |
| 4,990,944 | 2/1991 | Yamamoto et al. | 354/289.12 X |
| 5,113,217 | 5/1992 | Izumi et al. | 354/471 |
| 5,130,730 | 7/1992 | Ishii et al. | 354/253 |
| 5,142,319 | 8/1992 | Wakabayashi et al. | 354/289.1 X |
| 5,159,364 | 10/1992 | Yanagisawa et al. | 354/21 |
| 5,298,936 | 3/1994 | Akitake et al. | 354/471 |
| 5,309,195 | 5/1994 | Goo et al. | 354/484 |

FOREIGN PATENT DOCUMENTS

| | | |
|---|---|---|
| 2 120 394 | 11/1983 | United Kingdom . |
| 2 121 196 | 12/1983 | United Kingdom . |
| 2 205 955 | 12/1988 | United Kingdom . |
| 2 235 784 | 3/1991 | United Kingdom . |
| 2 235 983 | 3/1991 | United Kingdom . |
| 2 236 401 | 4/1991 | United Kingdom . |

*Primary Examiner*—Howard B. Blankenship
*Attorney, Agent, or Firm*—Finnegan, Henderson, Farabow, Garrett & Dunner, L.L.P.

[57] ABSTRACT

A function display system of a camera including a switch block, an automatic distance measuring circuit, a brightness measuring circuit, a motor driving circuit, and a function display unit. The CPU causes the function display unit to display each camera function in serial order after a power switch is pressed, thereby informing the user of camera functions. When a user presses a flash function or photograph function switch for a predetermined interval, the CPU changes camera sub-functions. The CPU displays a sub-function arranged by a user and a special sub-function arranged by a camera for a longer interval, allowing the user to select the sub-functions more easily. As a result, the camera display system and method provides a camera having improved convenience and efficiency.

14 Claims, 4 Drawing Sheets

CAMERA DISPLAY RESPONSIVE TO MOVEMENT OF LENS CAP

This is a continuation of application Ser. No. 08/160,270, filed Dec. 2, 1993, now abandoned.

BACKGROUND OF THE INVENTION

A. Field of the Invention

The present invention relates generally to a camera display system and method, more particularly to a display system for a camera that allows the camera user to be informed of camera functions and to select one of the functions.

B. Description of the Related Art

In a camera having various functions, such as photograph, flash and zoom, the user may operate a switch to select one of these functions. A typical camera displays functions with a liquid crystal display (LCD) when a user presses a switch and selects a displayed function when the user releases the switch. The user may press the switch intermittently or continually. When a user presses the switch intermittently, the camera displays a function each time the user presses the switch and the user presses the switch repeatedly until the desired function is displayed. When a user presses the switch continually, the camera displays the functions serially and the user releases the switch when the desired function is displayed.

Since this method displays only functions that are selectable, the user may have difficulty in remembering all the camera functions and may therefore refer to a manual. Further, when the user presses the switch intermittently to select a desired function located at the latter part of the display order, the user must press the switch numerous times before the desired function is displayed. When the user presses the switch continually, the camera may display the functions so swiftly that the user may be unable to release the switch at the moment the desired function is displayed.

SUMMARY OF THE INVENTION

An object of the present invention is to provide a camera display system and method that informs the user of the available functions and allows the user to efficiently select a function.

To achieve this and other objects of the present invention, a camera function display system comprises power switch means for generating a first signal; means for displaying camera functions; means for moving a lens cap; and controlling means for generating a signal to cause the moving means to open the lens cap and a signal to cause the display means to display a plurality of camera functions in sequential order, in response to the first signal.

According to another aspect of the present invention, a method for displaying functions of a camera having power switch means for generating a first signal, and a lens cap, and a switch means for generating a plurality of function signals, comprises the steps of moving the lens cap and sequentially displaying a plurality of camera functions, in response to the first signal; and executing a function corresponding to one of the function signals.

According to another aspect of the present invention, a function display system of a camera comprises function switch means for generating a plurality of function signals; means for selecting a function corresponding to one of the functions signals and for changing a sub-function corresponding to the function when the one of the function signals continues for a predetermined interval.

According to another aspect of the present invention, a method for displaying functions of a camera comprises the steps of changing a sub-function corresponding to a function when a function signal corresponding to the function continues for a predetermined interval; and determining whether the sub-function is of a certain type.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments of the invention and together with the description, serve to explain the principles of the invention.

DESCRIPTION OF THE PREFERRED EMBODIMENTS

The preferred embodiments of the present invention include a switch block having a power switch and two function switches, a flash function switch to select various flash functions and a photographing function switch to select various photographing functions. A CPU determines whether a lens cap is open and generates a motor drive signal for opening or closing the lens cap. The CPU also generates a function display signal to control a function display unit.

When power is applied, the CPU initializes operations and receives a signal from a power switch. The CPU determines whether a lens cap is opened or closed. If the lens cap is closed, the CPU opens the lens cap and displays all the functions at the function display unit in a serial order.

When the user operates a flash function switch or a photograph function switch, the CPU effects a selected function corresponding to these switches.

After power is applied to the camera, if a function switch is ON, the CPU determines whether a function switch is ON for a predetermined interval. If the function switch is ON for a predetermined interval and the function is effected, the CPU displays sub-functions belonging to the function for a predetermined interval. If one of the sub-functions is selected, the CPU effects the sub-function and displays for a predetermined interval.

Figure 1:
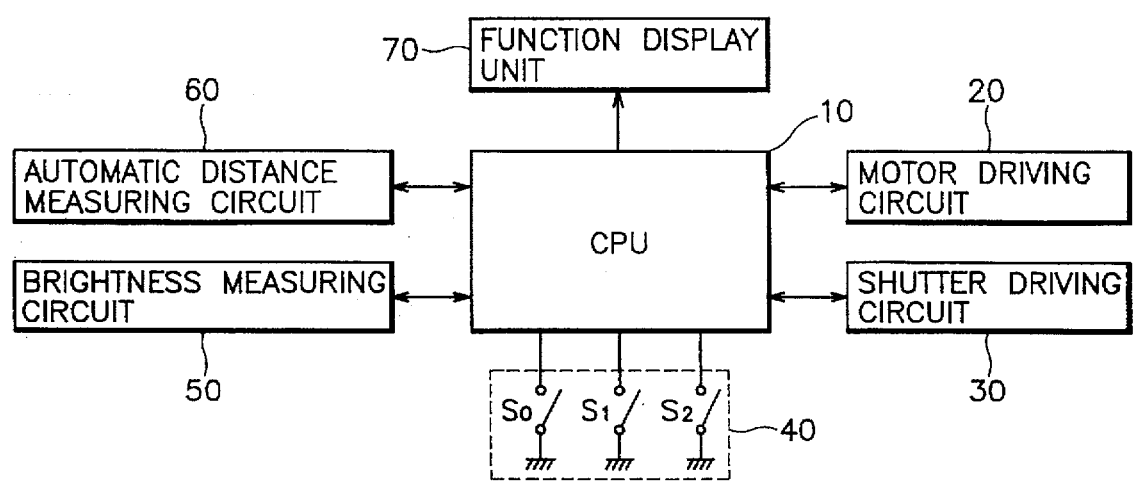
FIG. 1 is a block diagram illustrating one embodiment of the present invention.

FIG. 1 shows a function display system of the preferred camera including a central processing unit (CPU) 10. The CPU 10 is coupled to a motor driving circuit 20, a shutter driving circuit 30, a switch block 40, a brightness measuring circuit 50, an automatic distance measuring circuit 60, and a function display unit 70.

Figure 2:
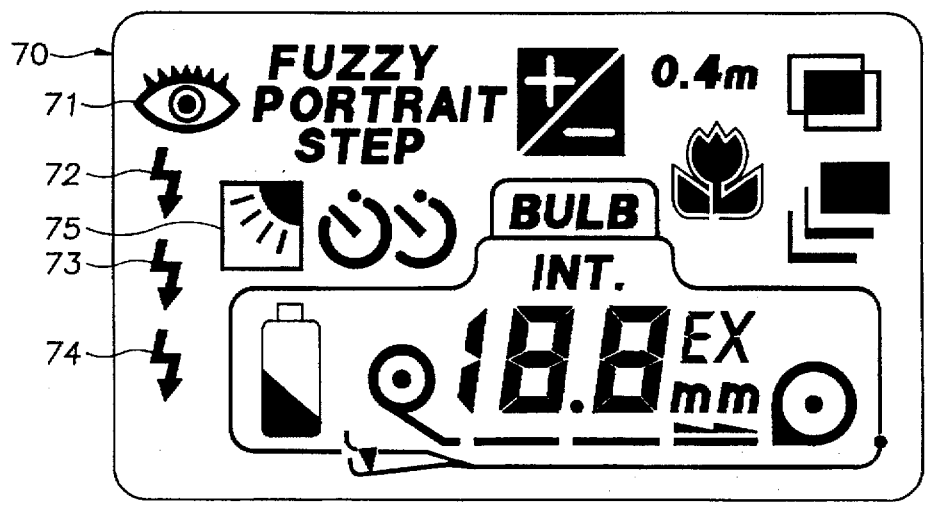
FIG. 2 is an illustration of a function display unit.

FIG. 2 shows the function display unit 70 in more detail.

Figure 3A:
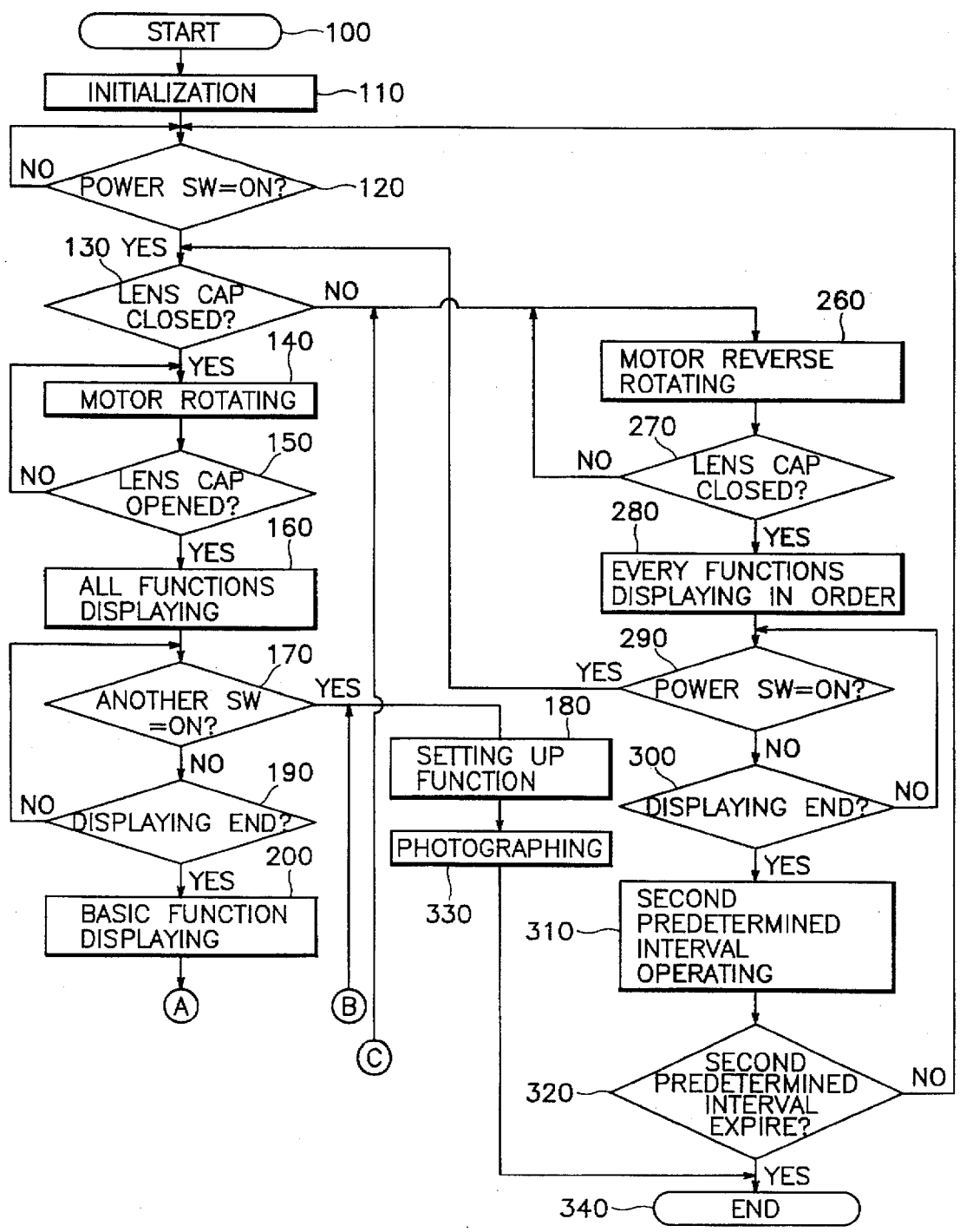
FIGS. 3A and 3B are flow charts showing the method of a first embodiment of the present invention.
Figure 3B:
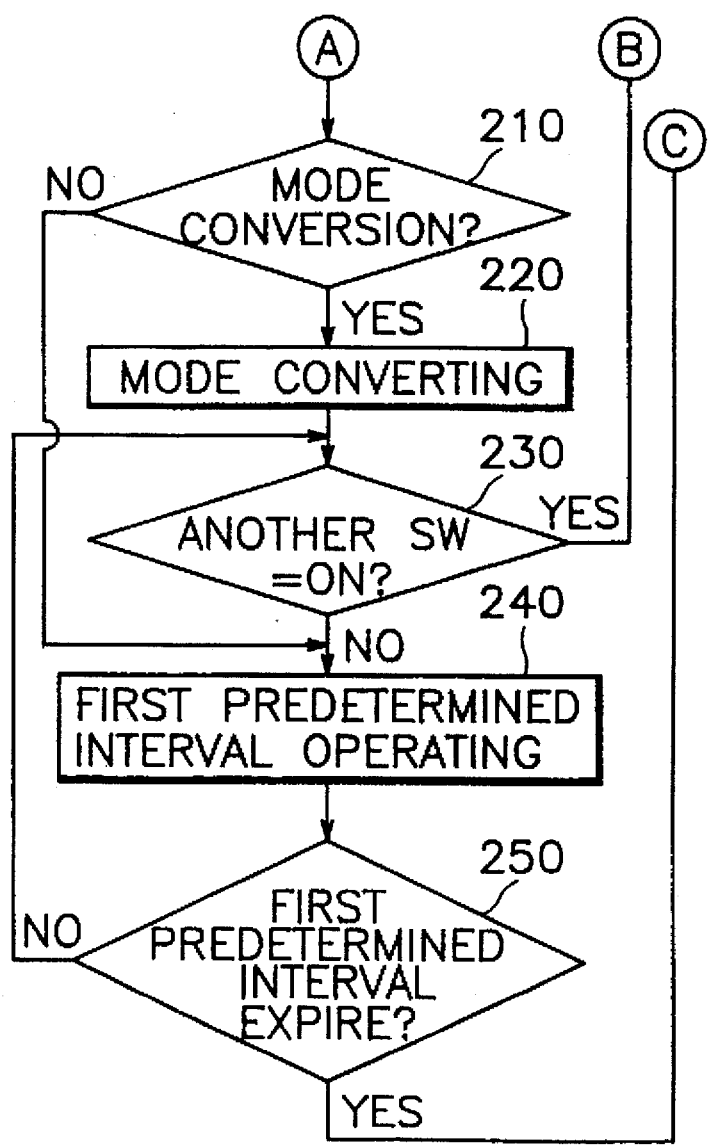

FIG. 3A and FIG. 3B show the operation of the camera function display system according to the first embodiment of the present invention. When power is applied to the camera, the CPU 10 initializes circuits (Step 110), and determines whether a power switch S0 is ON (Step 120). If the power switch S0 is ON, the CPU 10 determines whether a lens cap is opened or closed (Step 130).

If the lens cap is closed, the CPU 10 actuates the motor driving circuit 20 to turn a body tube motor (not shown) to open the lens cap (Step 140). After determining that the lens cap is completely opened (Step 150), the CPU 10 displays all the functions on the function display unit 70 for a predetermined interval (Step 160).

While displaying all the functions (Step 160), the CPU 10 determines whether there is a signal from a function switch (Step 170). If there is a signal from a function switch, the CPU 10 interrupts the Step 160 and executes the operations corresponding to the function of the switch (Step 180).

For the flash function or photograph function, after the CPU 10 executes the appropriate processing, a photograph is taken when the user releases the switch. The photograph is taken in accordance with a distance from an object input from automatic distance measuring circuit 60 and a brightness input from the brightness measuring circuit 50 (Step 330)

The CPU 10 determines whether all the functions have been displayed on display unit 70 (Step 190), and if all functions have been displayed, the CPU 10 effects a basic, automatic flash photograph, function at the function display unit 70 (Step 200).

After the basic function is effected, the CPU 10 determines whether there is a signal for selecting another function. If any, the basic function is changed into a selected function (Step 220)

Then the CPU 10 determines whether there is a signal of another function switch (Step 230). If there is such a signal, the CPU executes the function corresponding to the signal.

After the CPU 10 executes this process of setting the photograph function and opening the lens cap, if there is no signal from the switch block 40 for a predetermined interval, the CPU 10 times a first predetermined interval for closing the lens cap (Step 240) and determines whether the first predetermined interval expires (Step 250). If the first predetermined interval expires, the CPU 10 actuates the motor driving circuit to close the lens cap (Step 260)

In this process when the power switch S0 is turned ON, the CPU 10 determines whether the lens cap is opened, and if the lens cap is opened, the CPU 10 closes the lens cap by actuating a barrel motor (not shown) to rotate in reverse (Step 260). The CPU 10 determines whether the lens cap is closed (Step 270). After the lens cap is closed, the function display unit 70 displays each function at an interval of 4 seconds in serial order (Step 280).

For example, as shown in FIG. 2, a pink-eye effect reduced function 71 for preventing an eye in a photograph from appearing pink is displayed for 4 seconds. Subsequently, an automatic flash photography function 72 for emitting a flash according to the brightness of an object, a compulsory flash function 73 for emitting a flash with a predetermined illumination regardless of the brightness of an object, a flash prohibition function 74, and a back light correction function 75, are each displayed for 4 sec. Thus, function display unit 70 displays each function of the camera to inform the user of the various functions.

While displaying each function, the CPU 10 determines whether the power switch S0 is ON (Step 290). If the power switch S0 is ON, the CPU 10 returns to step 130. If the power switch S0 is OFF, the CPU 10 determines whether all the functions have been displayed on display unit 70 (Step 300).

If the displaying is complete, there is no signal from the switch block 40, and the lens cap is closed, the CPU 10 operates a second predetermined interval for terminating power to conserve power (Step 310). If the second predetermined interval does not expire, the CPU determines whether there is a signal from the switch block 40 but if the second predetermined interval expires, the CPU 10 terminates power and finishes processing.

As described above, after power is applied, every function of a camera is displayed so a user can be informed of the functions of the camera without referring to a manual and can utilize the functions efficiently.

Figure 4:
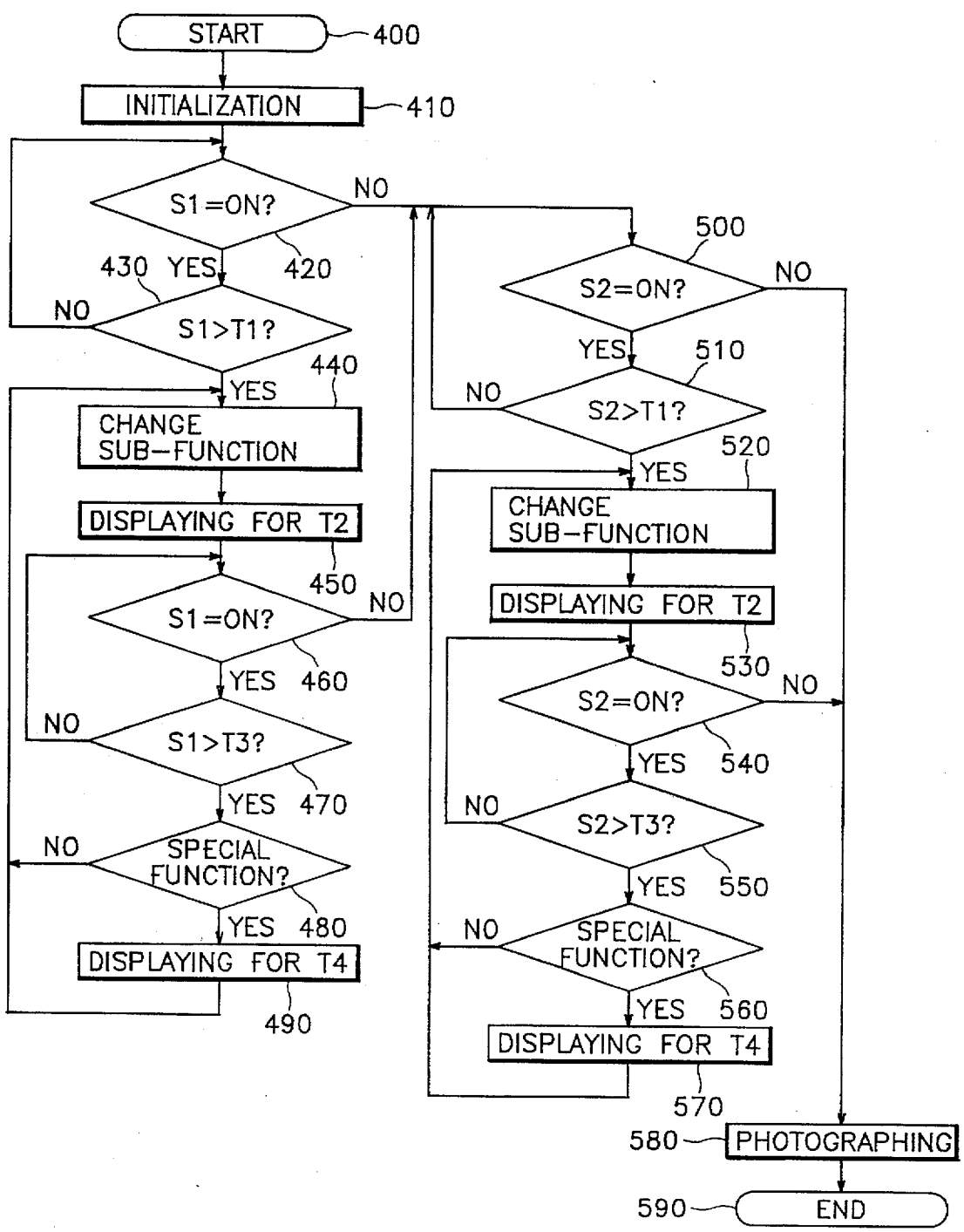
FIG. 4 is a flow chart showing the method of a second embodiment of the present invention.

FIG. 4 shows the operation of the second embodiment of the present invention. When power is applied to the camera, the CPU 10 initializes circuits (Step 410), and determines whether there is a signal from the function switches of the switch block 40 to select an optimal photographic function. For example, the CPU 10 determines whether a flash function switch (S1) is ON (Step 420). If the flash function switch S1 is ON, the CPU 10 determines whether the flash function switch S1 continues to be ON for a predetermined interval (T1) to confirm the state of the flash function switch S1 (Step 430). When the flash function switch S1 is OFF, the CPU 10 determines whether a photographing function switch S2 is ON (Step 500).

If the flash function switch S1 is ON for the predetermined interval T1, the flash function switch S1 is changed into a sub-function switch corresponding to the flash function (Step 440). A sub-function displayed at the function display unit 70 for predetermined interval T2 (Step 450).

If the flash function switch S1 is not continually ON for the predetermined interval T1, the CPU 10 disregards the signal of the flash function switch S1. After the flash function is displayed for the predetermined interval T1, the CPU 10 determines whether the flash function switch S1 is ON (Step 460).

If the flash function switch S1 is ON, the CPU 10 determines whether the flash function switch S1 continues to be ON for a predetermined interval T3 (Step 470). If the flash function switch is OFF, the CPU determines whether a photographing function switch S2 is ON (Step 500).

And if the flash function switch S1 continues to be ON for the predetermined interval T3, the CPU 10 determines whether the set-up flash sub-function is an initial flash function, a flash sub-function arranged by a user or a special flash sub-function arranged by a camera itself (Step 480).

If the set-up flash sub-function is not a special flash sub-function, it is changed into another sub-function and another sub-function is displayed at the function display unit 70 for the predetermined interval T2. If the set-up flash sub-function is a special flash sub-function, it is displayed additionally for the predetermined interval T4 so that a user may select a special flash sub-function easily. (Step 490) Thereafter, the set-up flash sub-function is changed into another sub-function and the CPU executes the same process repeatedly.

In the above-mentioned process, if the flash function switch S1 is OFF, the CPU 10 determines whether the photographing function switch S2 is ON (Step 500). If the photographing function switch S2 is ON, the CPU 10 processes the signal from the S2 switch in a manner analogous to the processing of the signal from the S1 switch described above (Steps 510–570).

If both the flash function switch S1 and the photographing function switch S2 are OFF, the CPU 10 sets up a basic photographing function. And then photographs are taken according to user's release signal (Step 580), and processing terminates (Step 590).

As embodied above, if a function switch is ON for a predetermined interval, sub-functions corresponding to the function switch are displayed at a certain interval, so the user may select a desired sub-function easily. In case of a special sub-function, it is displayed for a longer time, so the user can select special sub-function more easily. Consequently, the present invention can provide a function camera display system and that allows the user to be informed of all the functions by displaying all the functions at a certain interval and to select one of the functions conveniently by providing a predetermined interval before a function is changed.

What is claimed is:

1. A display system for a camera having a plurality of functions, comprising:

a power switch, when operated, for generating a signal;

means responsive to the generated signal for moving a lens cap to a first position at times when it is in a second position and for moving the lens cap to the second position at times when the lens cap is in the first position; and means for displaying each of the plurality of functions in sequence in response to the movement of the lens cap to the first position.

2. The system of claim 1 wherein the display means further displays each of the plurality of functions in sequence in response to the movement of the lens cap to the second position.

3. The system of claim 2 wherein the movement of the lens cap to the first position opens the lens cap.

4. The system of claim 2 wherein the movement of the lens cap to the second position closes the lens cap.

5. The system of claim 1 comprising:

means for measuring the distance of an object from the camera, and means for measuring the brightness of the object;

a photograph switch when operated for generating a second signal; and means responsive to the second signal at times when the functions are being displayed with the lens cap in the first position for photographing the object in accordance with the measured distance and brightness.

6. The system of claim 1 further comprising function switch means for generating a function signal, wherein the function signal interrupts sequential displaying of the display means and the display means displays a function corresponding to the function signal when the function switch means is operated.

7. The system of claim 6 further comprising function selection means responsive to the function signal for setting the function corresponding to the function signal.

8. A method for displaying camera functions having a power switch means for generating a first signal when operated, having a lens cap movable to a first position and a second position relative to a lens, and having function switch means for generating a plurality of function signals when operated, the method comprising the steps of:

operating the power switch means for generating the first signal;

moving the lens cap to the first position in response to the generation of the first signal at times when the lens cap is in the second position;

displaying each of a plurality of camera functions in sequence at times when the lens cap moves to the first position;

operating the function switch means for generating a function signal; and interrupting the sequential displaying of each of said camera functions in response to the function signal and displaying a camera function corresponding to the function signal.

9. The method of claim 8 further comprising:

moving the lens cap to the second position in response to the generation of the first signal at times when the lens cap is in the first position; and displaying each of a plurality of camera functions in sequence at times when the lens cap moves to the second position.

10. The method of claim 8 wherein the substep of displaying the camera functions in sequence includes displaying each of the camera functions sequentially for a particular time interval at times when the lens cap is closed.

11. The method of claim 8 further comprising the step of repeating the displaying and implementing a basic camera function upon completion of the repeated step of displaying.

12. The method of claim 8 comprising changing the camera function in response to the generation of another one of said plurality of function signals.

13. The method of claim 8 further comprising closing the lens cap in response to the absence of the function signal for a predetermined time interval.

14. The method of claim 13 further comprising the step of terminating power of the camera in response to the absence of the function signal for a second predetermined time interval longer than said predetermined time interval.

* * * * *